United States Patent
Scherzer et al.

[15] 3,663,816
[45] May 16, 1972

[54] SAMPLE-CONVEYING MECHANISM FOR SCINTILLATION COUNTING

[72] Inventors: Walter O. Scherzer, Wallingford, Conn.; Edward W. Thomas, Northport, N.Y.

[73] Assignee: Beckmann Instruments, Inc., Fullerton, Calif.

[22] Filed: May 20, 1966

[21] Appl. No.: 551,714

[52] U.S. Cl. ............................................. 250/106, 250/71.5
[51] Int. Cl. ....................................... G01t 1/20, G01t 7/02
[58] Field of Search ............................................ 250/106 SC

[56] References Cited

UNITED STATES PATENTS 3,163,756  12/1964  Meeder et al. .................. 250/106 SC

OTHER PUBLICATIONS

Solderholm, Lars G., " Elevator and Index Mechanism Handle Samples in Radiation Detector," Aug. 4, 1961 Design News

*Primary Examiner*—James W. Lawrence
*Assistant Examiner*—Morton J. Frome
*Attorney*—Robert J. Steinmeyer and Paul R. Harder

[57] ABSTRACT

A conveying mechanism for transporting a sample vial from an external loading platform into a light-tight counting chamber of a scintillation counter. The invention comprises a wall defining a counting chamber having an elongated passage, the wall having a shoulder, a sample platform, having a shaft coupled thereto to position the platform through the passage and into the counting chamber, and a sleeve movable about said shaft for engaging the shoulder to prevent external light from entering the counting chamber.

6 Claims, 6 Drawing Figures

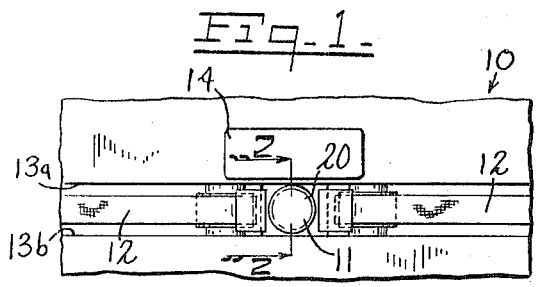
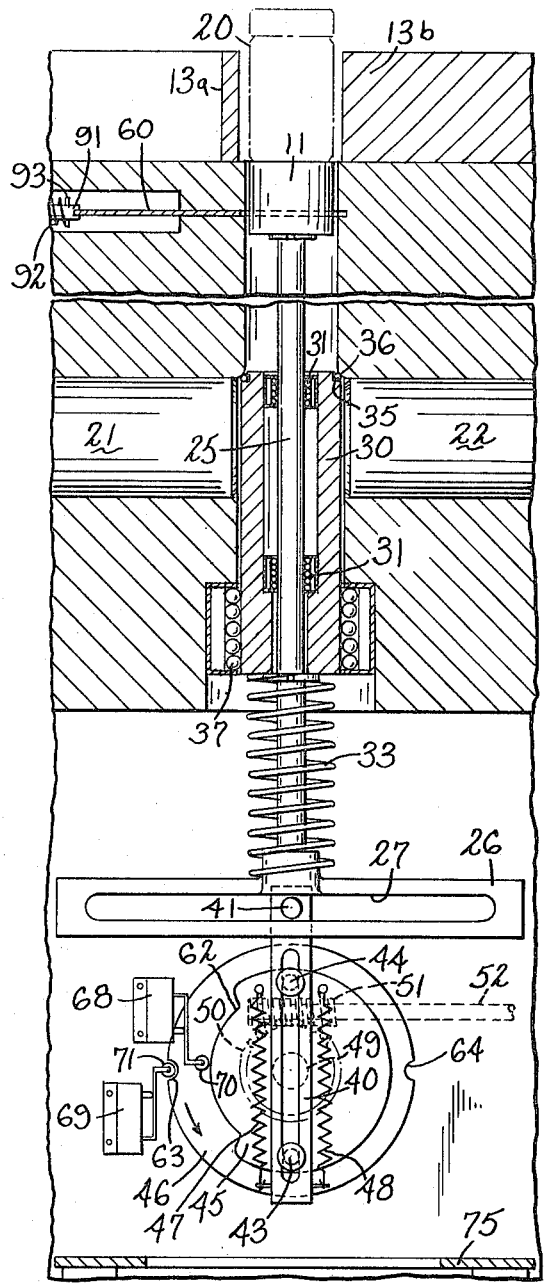
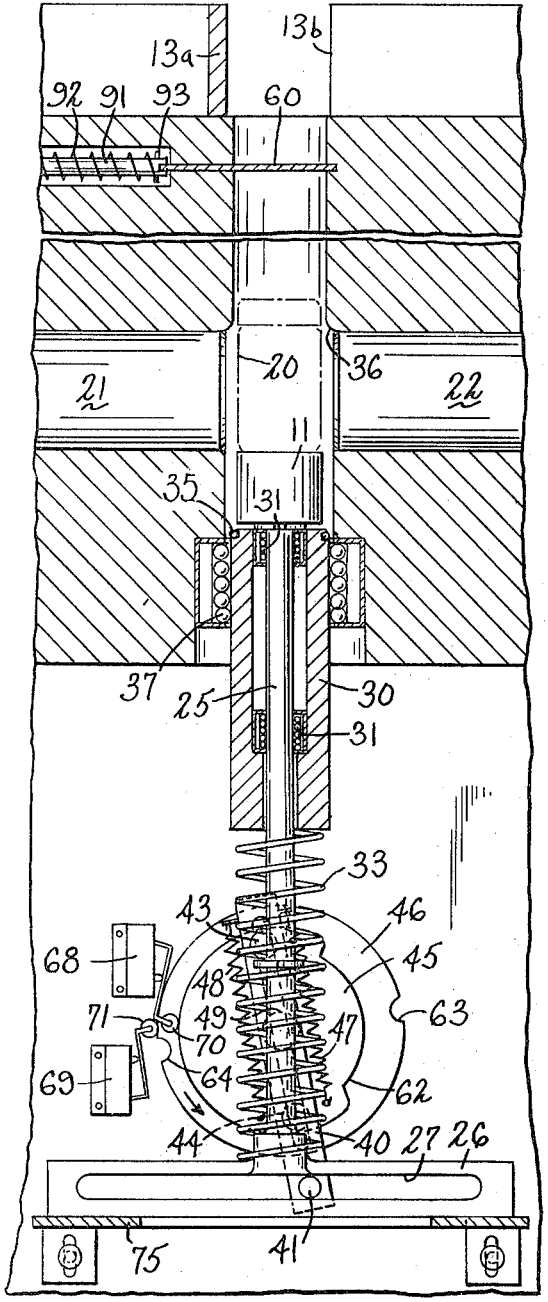
INVENTORS
Walter O. Scherzer
Edward W. Thomas
BY Dedio and Montgomery
ATTORNEYS INVENTORS
Walter O. Scherzer
Edward W. Thomas BY Dedio and Montgomery
ATTORNEYS

SAMPLE-CONVEYING MECHANISM FOR SCINTILLATION COUNTING

This invention relates to scintillation counting spectrometers and more particularly to a new and improved mechanism for transporting a sample vial from an external loading platform into a light-tight counting chamber of a scintillation spectrometer.

Scintillation counting is a method of measuring radio activity by counting radio active produced light emissions from a source of fluid contained within a sample vial. The counting of the light emissions is accomplished by the use of photomultiplier devices positioned about the vial, such that the light emissions will cause electrical signals to be produced at the same frequency that the light emissions are produced. In general, automatic liquid scintillation devices comprise a sample conveying mechanism for transporting vials to be observed to a position for loading into a counting chamber housing the photomultipliers. The movement of the vials from the sample conveyor is accomplished by the use of a loading elevator mechanism which, upon receiving a vial, brings it to a position in the vicinity adjacent to the photomultipliers, generally termed the counting chamber. Since the photomultiplier tubes are highly light-sensitive devices, the movement of the vial must be such that no outside light is permitted to be recorded by the photomultipliers. To accomplish this, a light-tight elevator mechanism is required.

The prior art has disclosed the use of a resilient O-ring surrounding the sample holder so that as the vial moves from the exterior of the spectrometer into the interior counting chamber, a light seal is provided until a shutter arrangement can be closed to prevent light from entering the counting chamber. Although a device of this type is quite effective, applicant has found that, due to the rubbing between the O-ring and the vial holder, extensive wear has generally occurred, thereby requiring frequent maintenance to insure that the device remained light-tight. Additionally, applicant has determined that the prior art structures are not capable of accurately positioning the sample within the counting chamber in a manner so that the position of the vial within the counting chamber would be reproduceable.

Accordingly, in order to correct for the deficiencies of the prior art, applicant has invented a new and improved sample loading mechanism having an interlocked, light seal arrangement to isolate the counting chamber from exterior light. Additionally, applicant has provided means for insuring that the position of the sample within the counting chamber will be accurately reproduceable each and every time the sample holder operates to position the sample vial within the counting chamber.

It is therefore an object of this invention to provide a new and improved sample loading mechanism.

Another object of the invention is to provide a new and improved sample loading mechanism having means for accurately positioning a sample vial within a counting chamber of a liquid scintillation spectrometer.

Another object of the invention is to provide a new and improved light sealing arrangement in a liquid scintillation spectrometer.

A further object of the invention is to provide a new and improved mechanism for operating a sample loader utilized to position sample vials in a counting chamber of a liquid scintillation spectrometer.

Still other objects and advantages of the invention will in part be obvious and will in part be apparent from the specification.

The invention accordingly comprises the features of construction, combinations of elements and arrangements of parts which will be exemplified in the constructions hereinafter set forth, and the scope of the invention will be indicated in the claims.

For a fuller understanding of the invention, reference is had to the following description, taken in connection with the accompanying drawings, in which FIG. 1 is a top view of a sample loading mechanism with a portion of a sample conveying mechanism for a liquid scintillation spectrometer according to the invention;

FIG. 2 is a sectional view taken along line 2—2 of FIG. 1;

FIG. 3 is a view similar to FIG. 2, with the operative parts in a different position;

Figure 4:
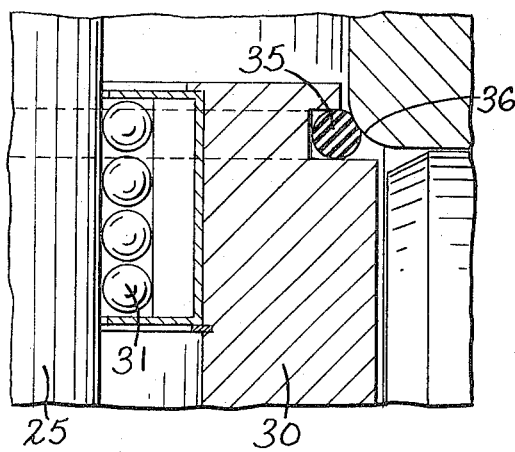
FIG. 4 is an enlarged view of a portion of the apparatus shown in FIGS. 2 and 3.

Referring to FIG. 1, there is shown a top view of a sample positioning mechanism 10 according to the invention, as seen from the top surface of a liquid scintillation counter. The sample positioning mechanism 10 as shown in this Figure, comprises a sample loading platform 11 which is positioned adjacent two belts 12 of a sample conveyor. The belts 12 transport vials of liquid to be counted to and from the top surface of the platform. The vials are guided within channels 13a and 13b of the sample conveying system. At 14 there is shown a mechanism which is generally included in prior art devices for detecting the presence of the sample to initiate the action of the sample positioning mechanism by movement of platform 11 downwardly into the interior of the spectrometer apparatus. The device 14 generally includes an optical system comprising a photocell and light source for detecting the presence of the sample.

Referring now to FIG. 2, there is shown a sectional view of the sample positioning mechanism according to the invention. Positioned on sample platform 11, which is generally termed an elevator, is a sample vial shown dotted at 20. The purpose of the loading mechanism is to position the vial 20 into the interior of the liquid scintillation spectrometer, such that it may be viewed by two photocells 21 and 22 in order to count light emissions emanating from fluid held within the container 20. The area between the photocells 21 and 22 is generally termed the counting chamber. The platform 11 is supported by the elevator shaft 25 which is coupled at its lower end to a yoke 26 having a slot 27 therein. The shaft 25 is free to move vertically within a sleeve 30 while sliding against linear bearings 31 positioned therein. The sleeve 30 is biased against downward movement by the action of a spring 33 positioned between the yoke 26 and the bottom of the sleeve. The top of the sleeve includes an O-ring 35 which abuts against a shoulder portion 36 of the interior of the scintillation spectrometer, such that a seal is formed between the sleeve and the shoulder portion 36. The sleeve 30 is also mounted for slidable movement within the spectrometer against linear bearings shown at 37. In order to move the platform 11 into the interior of the spectrometer, such that the sample vial 20 may be positioned in the counting chamber, there is provided a slotted arm 40 having a pin 41 mounted therein which is positioned within slot 27 of the yoke 26. The arm 40 is supported by two pin and retainer members 43 and 44, respectively, which are in turn supported by two cams 45 and 46. The arm 40 is resiliently biased by springs 47 and 48 in an upward direction, as shown. The cams 45 and 46 are mounted on a shaft 49 having a gear 50 mounted thereon which in turn is driven by a worm gear 51 mounted on a shaft 52. The shaft 52 is driven from a motor which is shown diagrammatically in FIG. 6. As cams 45 and 46 rotate, the arm 40 will simultaneously rotate, as shown by the arrow in FIG. 2, thereby causing the elevator 11 to move downwardly to position the sample 20 within the counting chamber.

There is shown positioned adjacent the top of the scintillation spectrometer 10 a shutter arrangement 60 which is utilized to seal off the counting chamber from the exterior light as the elevator 11 moves downwardly, causing the seal to be broken between the O-ring 35 and the portion 36 of the spectrometer.

In order to time the sequence of events, that is, the movement of the platform and the sample vial downwardly and the positioning of the shutter 60, the cams 45 and 46 are formed with cut-outs or notches 62, 63 and 64, respectively. The notch 62 of cam 45 controls the movement of the shutter 60, whereas the other notches, 63 and 64 of cam 46, control the movement and the stopping of the elevator platform 11. Positioned adjacent cams 45 and 46 are switches 68 and 69, respectively, having cam followers 70 and 71 to effect the opening or closing of the switches, as the case may be.

In FIG. 3 there is shown the shutter in a closed position to seal the external light from the counting chamber and the platform in a downward position at the bottom extent of its movement. As shown, cams 45 and 46 have rotated the arm 40, such that the yoke 26 is positioned against an adjustable base 75. As cams 45 and 46 rotate, moving the pin 41 within the slot 27, the yoke 26 is moved downwardly until it engages the base 75. While this is occurring, cam follower 71 is rotating around the outside surface of the cam 46. As the arm 40 rotates, the pin moves to the left and then downwardly in an arc causing yoke 26 to follow. As the yoke 26 engages the base 75, the arm 40 will move upwardly against springs 47 and 48 until the follower 71 enters the notched stop 64. At this time the motor driving the shaft 52 will stop, thereby maintaining the elevator platform 11 in the position as shown in FIG. 3.

By means of springs 47 and 48, resiliently biasing the arm 40 as shown, the motor driving the shaft 52 need not be instantaneously stopped in order to insure that the vial is accurately positioned in the counting chamber of the spectrometer. The extent of movement of the elevator is nulled over a portion of its travel by the action of the arm 40 against springs 47 and 48 as the cams 45 and 46 continue to rotate until such time as they are stopped. As the elevator platform moves downwardly, it carries sleeve 30 therewith, so that the light seal is broken between the O-ring 35 and the portion 36 of the spectrometer. In order to maintain the seal, the shutter 60 is activated by the section of cam 45 against the follower 70, maintaining the shutter in a closed position. In FIG. 4 there is shown in more detail the light seal formed between O-ring 35 and the abutting portion 36.

Figure 5:
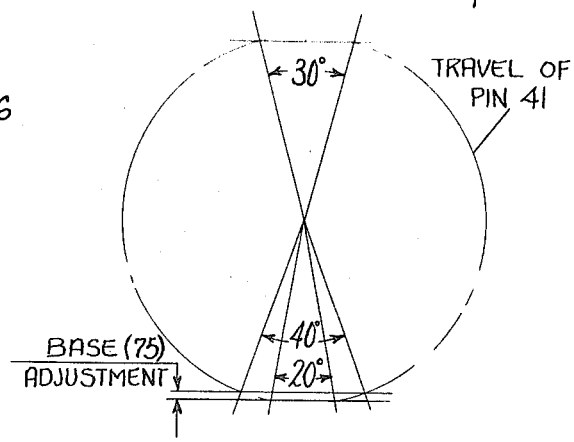
FIG. 5 is a graph illustrating the position of a portion of the apparatus according to the invention.

In FIG. 5 there is shown a graph illustrating the travel of the pin 41 within the slot 27. By provision of the resilient adjustment for the slotted arm 40, the movement of the pin may be stopped anywhere within 30° at the upper extent of its rise and anywhere between 20° and 40° at the extent of its fall, depending upon the position of the adjustable base 75. Because of the great latitude at which the pin may move without effecting the accuracy of the positioning of the elevator platform 11, accurate positioning of the limit switches and the instantaneous stopping of the drive motor operating shaft 52, is not required. The specific degrees shown in FIG. 5 are only illustrative of the preferred embodiment of the invention. It is to be understood that by suitable adjustments the degree of travel of the pin may be altered without effecting the positioning of the platform 11 and without causing a critical situation to occur, such that the motor driving shaft 50 would not have to be instantaneously stopped.

FIG. 5 further shows that at the upper extent of travel of the pin 41 and at the lower extent of travel of pin 41, the pin moves in a straight line against slot 27 of yoke 26, rather than in an arcuate path, thus insuring that during the time that cams 45 and 46 could be stopped the elevator platform 11 will not change its vertical position.

Figure 6:
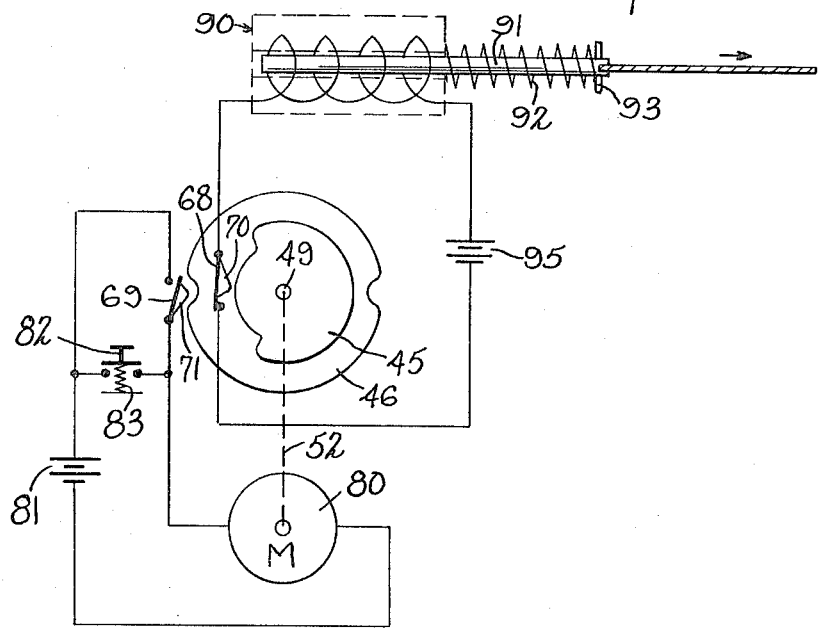
FIG. 6 is a schematic diagram illustrating the circuitry for operating the moving parts of the invention.

Referring now to FIG. 6, there is shown a schematic diagram illustrating the circuitry according to the invention, for accomplishing movement of the shutter as well as the elevator of the invention. A motor 80 is shown for driving the cams 45 and 46 through the shaft 52. The motor 80 is in series with a voltage source 81. Coupled across the series connection of the motor 80 and voltage source 81 is a pushbutton switch 82 which is normally in the open position. Upon depression of the switch and by holding it down, the motor 80 will be energized, thereby causing cams 45 and 46 to rotate as shown by the arrow. Coupled in parallel with switch 82 is the previously mentioned switch 69 having mounted thereon the cam follower 71 for engaging the surface of the cam 46. Thus, as cam 46 rotates after switch 82 is depressed, the cam follower 71 will leave notch portion 63 and ride on the arcuate surface of the cam 46, such that switch 69 will be held in a closed position, thus maintaining the motor 80 energized after switch 82 is released.

In order to effect the timed movement of shutter 60, the shutter is held in place by an electromagnet solenoid device 90 connected in series with a battery 94 which, when energized, will draw a bar of magnetic material 91 holding the shutter 60 to the left, as shown in solid in FIG. 2. When the cam 45 moves around, such that the surface of the cam 45 causes switch 68 to open, the solenoid 90 will be de-energized to permit shutter 60 to move to the closed position as shown in FIG. 3.

Although it is believed that the operation of the device is apparent from the description herein, a short description of the operation is provided below to clarify the complete operation of the sample loading mechanism.

Initially, the vial 20 is positioned on the platform 11, as shown in FIG. 2. The cams 45 and 46 are positioned as shown in FIGS. 2 and 6, such that switch 68 is closed, the shutter 60 is in the recessed position, and switch 69 is open, thus de-energizing the motor 80. To start the elevator platform 11 in operation, the switch 82 is depressed momentarily to start the motor 80 and thereby cause cam 46 to rotate to maintain the switch 69 in a closed position, thus permitting the motor to continue to operate. The arm 40 will begin to move slowly in an arc and the yoke 26, shaft 25 and platform 11 in a downward direction. As the vial 20 passes below the plane of the shutter 60, the switch 68 will be opened by the action of cam follower 70 against the ungrooved portion of the cam 45, thereby closing the shutter 60 over the counting chamber. As cam 46 continues to move downwardly, the yoke 26 will eventually bottom against the adjustable base 75 and the arm 40 will begin to slowly rise against the springs 47 and 48. This sets the extent of the downward movement of platform 11 and the position of the vial within the counting chamber. As platform 11 moves downwardly, it engages sleeve 30 and causes it to follow downwardly therewith. Since the shutter is already closed before the light seal is broken between the O-ring 35 and the shoulder 36, external light is always prevented from entering the counting chamber. As cam 46 continues to rotate, cam follower 71 will enter the notch 64 to cause the motor 80 to become de-energized. At this time the counting operation takes place by the activation of equipment external the sample loading mechanism. When the counting period has been concluded, switch 82 having a return spring 83 may again be depressed to cause a reverse action to take place, whereby the sample vial 20 is raised to the position shown in FIG. 2 and another sample may be placed on the platform 11 in order to repeat the performance and count the number of light emissions from the next sample.

It will thus be seen that the objects set forth above, among those made apparent from the preceding description are efficiently attained and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An apparatus for scintillation counting and analogous purposes, comprising wall means defining a counting chamber and an elongated passage connecting said chamber with the exterior, said wall means having a shoulder portion between the counting chamber and the exterior, the sample platform movable through a portion of said passage and into said counting chamber, the shaft coupled to said platform for positioning said platform within said passage and said counting chamber, a sleeve movable about said shaft, said sleeve having light sealing means for engaging said shoulder portion of said wall means, a yoke having a slot therein, said yoke coupled to said shaft and movable therewith, an arm having a guide slot therein and a pin on one end thereof, said pin positioned within the slot of said yoke, means for rotating said arm to position said platform within said wall means, said rotating means including a first rotatable cam having pin and retainer means slidably positioned within the slot of said arm, and resilient biasing means for forcing said arm toward said yoke.

2. An apparatus in accordance with claim 1, wherein a second cam is mounted on said first cam and is rotatable therewith, and a shutter for closing off said counting chamber from the exterior, said shutter actuated responsive to the profile of said second cam.

3. An apparatus in accordance with claim 1, including one or more stopping means for independently engaging the yoke to limit the movement of said shaft.

4. An apparatus in accordance with claim 3, wherein at least one of said stopping means is adjustable toward and away from said counting chamber.

5. An apparatus in accordance with claim 1, including a motor for rotating the first cam, said motor responsive to the profile of said first cam such that the platform is stopped in the counting chamber and in position to receive a sample vial.

6. An apparatus for scintillation counting and analogous purposes, comprising wall means defining a counting chamber and an elongated passage connecting said chamber with the exterior, a sample platform movable through a portion of said passage and into said counting chamber, first and second cams coupled together, said cams mounted for rotation about an axis, a shaft coupled to said platform, a yoke having a slot, said shaft coupled to said yoke, an arm having a slot and also having a pin on one end thereof movable in said slot of said yoke, a plurality of pins supported by said cams, said plurality of pins positioned to move within the slot of said arm, said cams having cut-outs over a portion of their circular surface, a shutter supported in said wall means for sealing said counting chamber from the exterior, and means responsive to the cut-outs on said cams for stopping the platform and actuating the shutter.

* * * * *